9239X
E. FISK & J. C. GREEN.
ANTIFRICTION BOX FOR HUBS AND ROTARY BEARINGS OF MACHINERY.
Patented Nov. 14, 1835.
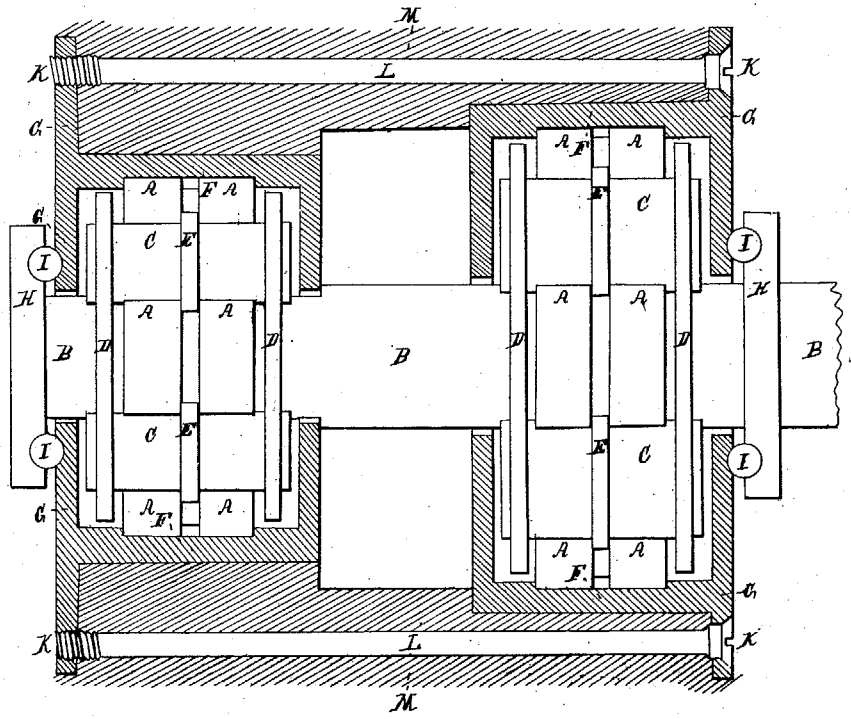
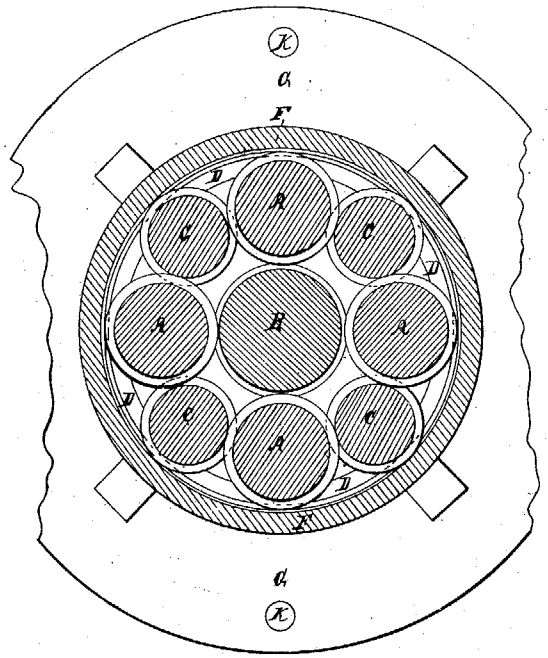
THE NORRIS PETERS CO., PHOTO-LITHO., WASHINGTON, D. C.

9239X Nov. 14, 1835

Nov. 14, 1835 91.

Ezra Fisk and Joseph C. Green

697

The schedule referred to in these Letters Patent and making part of the same containing a description in the words of the said Ezra Fisk and Joseph C. Green themselves of their improvement in the Antifriction box for Hubs and Rotary bearings of Machinery.

To all to whom these presents shall come

Be it known that we Ezra Fisk and Joseph C. Green both of Fayette in the County of Kennebec and State of Maine have invented a new and useful Antifriction box to be applied and used in the hubs of Carriage wheels and in the rotary bearings of machinery and that the following is a full and exact description of the construction and operation of said box as invented by us A combination of friction rollers six eight in number constitute the bases of this box. the size of the rollers may be various according to their application and use. There are four primary rollers of equal diameters which are placed on the four quarter sections of a circle leaving a central space between them, sufficient to accommodate the size of the axle or shaft which is designed to work in the box, There are also four secondary rollers of equal diameters the diameters varying so as to adapt them to the size of the primary rollers. these occupy the spaces between the primary rollers; and their horizontal thickness must exceed that of the primary sufficient to receive a metallic ring or collar on each side of the primary rollers. The secondary rollers and collars are connected by making grooves on the periphery of the rollers corresponding to the horizontal thickness of the collars. To prevent the collars from coming in contact with the sides of the primary rollers, the space between the grooves on the secondary rollers must exceed the horizontal thickness of the primary, about one eighth of an inch and to prevent any any horizontal movement of the secondary rollers, suitable
tongues are made on their peripheries at the centre of their hori-
zontal thickness fitted to work in corresponding grooves in
the periphery of the primary rollers. This combination of
rollers is enclosed by a metallic hoop of sufficient strength
having regard to the pressure or load to be sustained.
On each side of the combination of rollers is a circular
piece of plate of some suitable kind of Metal exactly fit
ted to the inside of enclosing hoop and confined to their
places by any suitable kind of fastening. Thro' these plates
at the centre, are round perforations the diameter of which
must exceed that of the axle or shaft about one fourth
of an inch. in the inner surface of the enclosing hoop
is a groove one eighth of an inch deep the width cor
responding to the horizontal thickness of the primary
rollers. the edges of which work in the groove. When
a shaft is inserted in the box the primary rollers have a
peripheral bearing both on the axle and the enclosing
hoop. The secondary rollers have also a peripheral
bearing both on the curvature of the collars and the
periphery of the primary rollers. The space between the
plates and the rollers should be one eighth of an inch
on each side. All the component parts of the box should
be made of some suitable kind of Metal having re-
gard to the degree of strength and elegance required.
When the size of the axle and the enclosing hoop are deter-
mined. the diameter of the primary rollers must be such
as precisely fill the space between the axle and the enclosing
hoop. The secondary rollers must not be so large as
to bring their collars in contact with the enclosing
hoop. The foregoing is a general description both
of the exterior and interior structure of the box. We have
stated no specific materials to be employed in its construc-
tion tion for they may be various according as fancy or judg-
ment shall dictate. and we have given no specific dimen-
sions of the component parts of the box for they must necessarily
be various according to the application and use of the box
The above specified mode of combining the rollers is such
that in their application and use all the bearings are per-
ipheral consequently the operation of all the parts is en-
tirely on the roller principles. To relieve friction on
the shoulder of the axle, at the inward end of the hub a me-
tallic collar is fitted on the axle with a groove in that
next the hub and the end of the hub is prevented from coming
side of it which comes ^ in contact with the collar. by placing
in the groove a ball of some suitable kind of hard met-
al, A like collar and ball is fitted on the axle tree
at the outward end of the hub. These collars with the
balls are not considered as a necessary appendage of the
box, the box may be used with or without them at
pleasure. In the application of the above
specified antifriction box to the wheels of a single
horse ----- -----waggon or chaise the following dimen-
sions are considered convenient. The enclosing hoop
may be made of cast iron or any suitable composi-
tion of metals five inches diameter inside and of
suitable thickness say half an inch. and about four
inches in width. The plate or side of the box which
comes next to the hub. should be cast with the hoop
The extension of the hoop on the hub may be one
inch and its thickness at its termination on the hub
may be reduced to one fourth of an inch. Round per-
forations half an inch diameter are made thro' the
plate at the four quarter sections of a circle about half
an inch from the inside of the hoop and corresponding
perforations are made through the length of the hub
One box is confined to each end of the hub by passing [illegible]

92394X iron bolts thro' the perforations in the plates and hub with heads on one end of the bolts, counter sunk in the plate of the inside box and a screw on the other ends of the bolts, fitted to screw into the perforations made in the plate of the outside box. The diameter of the box attached to the outward end of the hub may be about three fourths of an inch less than the box on the inward end of the hub. To render the connexion between the box and hub more permanent, there are on the side of the plates which come in contact with the end of the hub and in the intervening spaces between the above described perforations, projections one inch in length and half an inch rise the projection being fitted into corresponding excavations made in the ends of the hubs on lines drawn from the circumference towards the centre. The diameter of the axle for a hub of the above stated dimensions may be one inch and three fourths, — the diameter of the primary roller will then be about one inch and five eighths, and the diameter of the secondary roller about ~~one~~ an inch and one eighth. The collars which enclose the secondary rollers may be one fourth of an inch thro' each way. The box on the outward end of the hub being three fourths of an inch (or more at pleasure) less than the box on the inward end of the hub, the outward end of the axle will be proportionably smaller _ that at the shoulder.

The collar which forms the shoulder of the axle of the hub and carries a friction ball, may project about one inch from the surface of the axle and the ball may be half an inch diameter, the collar and ball at the other end of the hub must be proportionably smaller. To prepare the above described box to be used as a bearing for any rotary shaft it is only necessary to make such additions to the enclosing hoop as will answer the purpose for fastening according to its [illegible]

96. 92597 ing and using the collars on the axle or shaft together with the balls

Witnesses

Humphrey Hughes

Charles Green

Ezra Smith

Joseph C. Green

2 H.B.

Feb. 21 1857

(1826 words)

(Drawing)